(12) United States Patent
Katou

(10) Patent No.: US 11,439,914 B2
(45) Date of Patent: Sep. 13, 2022

(54) GAME PROGRAM AND GAME SYSTEM

(71) Applicant: SQUARE ENIX CO., LTD., Tokyo (JP)

(72) Inventor: Jun Katou, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 18 days.

(21) Appl. No.: 16/927,113

(22) Filed: Jul. 13, 2020

(65) Prior Publication Data

US 2021/0016188 A1  Jan. 21, 2021

(30) Foreign Application Priority Data

Jul. 16, 2019 (JP) .............................. JP2019-131504

(51) Int. Cl.
*A63F 13/822* (2014.01)
*A63F 13/847* (2014.01)
*A63F 13/35* (2014.01)
*A63F 13/46* (2014.01)

(52) U.S. Cl.
CPC ............ *A63F 13/822* (2014.09); *A63F 13/35* (2014.09); *A63F 13/46* (2014.09); *A63F 13/847* (2014.09); *A63F 2300/807* (2013.01)

(58) Field of Classification Search
CPC ........ A63F 13/822; A63F 13/35; A63F 13/46; A63F 13/798; A63F 13/847; A63F 2300/807; A63F 13/58; A63F 2300/558; A63F 2300/65

See application file for complete search history.

(56) References Cited

U.S. PATENT DOCUMENTS

| | | | | |
|---|---|---|---|---|
| 6,482,092 B1* | 11/2002 | Tajiri | ................... | A63F 13/10 463/43 |
| 11,020,673 B2* | 6/2021 | Higo | ................... | A63F 13/42 |
| 2003/0109299 A1* | 6/2003 | Reizei | ................... | A63F 13/10 463/11 |
| 2004/0259634 A1* | 12/2004 | Machida | ............ | A63F 13/5375 463/29 |

(Continued)

OTHER PUBLICATIONS

Quartermaster officer: Supplying War of WW2 / Quartermaster General, rules/instructions by Nnnn-san, [Online] bodoge, Dec. 7, 2018, <URL: https://bodoge.hoobby.net/games/quartemaster-general/insructions/6158> with a partial corresponding English translation.

(Continued)

*Primary Examiner* — Seng H Lim
(74) *Attorney, Agent, or Firm* — Greenblum & Bernstein, P.L.C.

(57) ABSTRACT

To provide a game program of sufficient interest having high strategic quality. The program, given that a predetermined host object among host objects is defined as a first object and furthermore, a host object different from the first object is defined as a second object, in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

12 Claims, 18 Drawing Sheets

(56) References Cited

U.S. PATENT DOCUMENTS

| | | | | |
|---|---|---|---|---|
| 2008/0039169 A1* | 2/2008 | Harris | ............ | G07F 17/32 |
| | | | | 463/9 |
| 2010/0099471 A1* | 4/2010 | Feeney | ............ | G06Q 30/02 |
| | | | | 463/1 |
| 2011/0294561 A1* | 12/2011 | Shaw | ............ | G07F 17/34 |
| | | | | 463/20 |
| 2014/0235352 A1* | 8/2014 | Ikeda | ............ | A63F 13/822 |
| | | | | 463/42 |
| 2014/0274381 A1* | 9/2014 | Kojo | ............ | A63F 13/87 |
| | | | | 463/31 |
| 2014/0302935 A1* | 10/2014 | Royce | ............ | A63F 13/44 |
| | | | | 463/42 |
| 2015/0231499 A1* | 8/2015 | Mizukami | ............ | A63F 13/822 |
| | | | | 463/31 |
| 2016/0124518 A1* | 5/2016 | Takahashi | ............ | A63F 13/822 |
| | | | | 463/31 |
| 2016/0271499 A1* | 9/2016 | Higo | ............ | A63F 13/35 |
| 2019/0184292 A1* | 6/2019 | Higo | ............ | A63F 13/42 |
| 2020/0171392 A1* | 6/2020 | Tsutsumizaki | ............ | A63F 13/795 |
| 2020/0368613 A1* | 11/2020 | Kasawa | ............ | A63F 13/533 |

OTHER PUBLICATIONS

Sangokushi VI, [Online] Wikipedia(JP), Apr. 10, 2019, [search date: Jul. 31, 2020] <URL: https://ja.wikipedia.org/w/index.php?title=三国志VI&oldid=72335085> with a partial corresponding English translation.

Japanese Office Action dated Aug. 25, 2020 issued in Japanese patent application No. JP2019-131504 with a partial corresponding English translation.

\* cited by examiner

POINT MASTER TABLE

GAME PROGRAM AND GAME SYSTEM

CROSS REFERENCE TO RELATED APPLICATION

The present disclosure relates to subject matter contained in Japanese Patent Application No. 2019-131504, filed on Jul. 16, 2019, the disclosure of which is expressly incorporated herein by reference in its entirety.

TECHNICAL FIELD

The present invention relates to a game program and a game system.

BACKGROUND ART

In the related art, a game in which competition for increasing a governance range by attacking an enemy base and increasing the number of ally bases is performed is present.

SUMMARY OF INVENTION

Technical Problem

In the game of the related art, for example, each base is regarded as having an equivalent value such that winning and losing are determined in correspondence with the number of possessed bases. Thus, there is a lack of strategies related to a method of invading the enemy base or a method of defending the ally base, and a game of sufficient interest has not been provided.

An object of at least one embodiment of the present invention is to provide a game program of sufficient interest having high strategic quality.

Solution to Problem

According to a non-limiting aspect, a non-transitory computer-readable recording medium including a game program causing a server apparatus to execute a battle game that progresses by executing a predetermined action on an enemy object in the server apparatus capable of communicating with and connecting to a terminal apparatus operated by a player, the game program causing the server apparatus to function as: a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

According to a non-limiting aspect, a game system that includes a terminal apparatus operated by a player and a server apparatus capable of communicating with and connecting to the terminal apparatus and is related to a battle game which progresses by executing a predetermined action on an enemy object, the game system including: a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

According to a non-limiting aspect, a non-transitory computer-readable recording medium including a game program for executing a battle game that progresses by executing a predetermined action on an enemy object in a terminal apparatus that is operated by a player and is capable of communicating with and connecting to a server apparatus, the game program causing the terminal apparatus to function as: a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

Advantageous Effects of Invention

One or more of the above problems can be solved with each embodiment of the present invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

A summary of a first embodiment of the present invention will be described. Hereinafter, a game program causing a server apparatus to execute a battle game that progresses by executing a predetermined action on an enemy object in the server apparatus capable of connecting to and communicating with a terminal apparatus operated by a player will be illustratively described.

Figure 1:
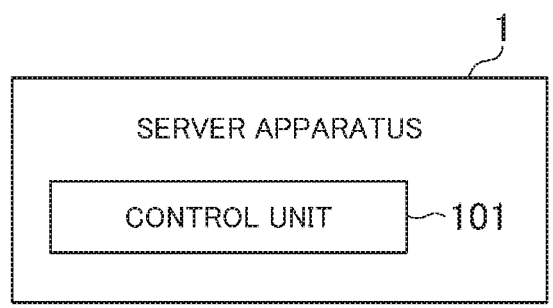
FIG. 1 is a block diagram illustrating a configuration of a server apparatus corresponding to at least one embodiment of the present invention.

FIG. 1 is a block diagram illustrating a configuration of a server apparatus corresponding to at least one embodiment of the present invention. A server apparatus 1 includes at least a control unit 101.

The control unit 101 has a function of controlling the predetermined action to be executable on one enemy object in a case where one or more host objects having a predetermined first relationship with the one enemy object is/are present and any of the host objects is a first object, and a case where the one or more host objects having the predetermined first relationship with the one enemy object is/are present and any of the host objects is a second object having a predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object.

Figure 2:
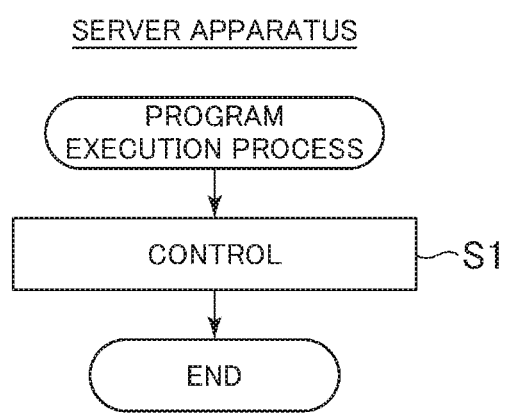
FIG. 2 is a flowchart of a program execution process corresponding to at least one embodiment of the present invention.

A program execution process in the first embodiment of the present invention will be described. FIG. 2 is a flowchart of a program execution process corresponding to at least one embodiment of the present invention.

The server apparatus 1 controls the predetermined action to be executable on the one enemy object in a case where the one or more host objects having the predetermined first relationship with the one enemy object are present and any of the host objects is the first object, and a case where the one or more host objects having the predetermined first relationship with the one enemy object is/are present and any of the host objects is the second object having the predetermined second relationship with the first object, and controls the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object (step S1), and terminates the program execution process.

As one aspect of the first embodiment, by controlling the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object, a game program of sufficient interest having high strategic quality can be provided.

In the first embodiment, the "terminal apparatus" refers to an apparatus such as a mobile phone, a smartphone, or a portable game console. The "server apparatus" refers to, for example, an apparatus executing a process in response to a request from the terminal apparatus.

In the first embodiment, for example, the "object" refers to a tangible object appearing in the game and more specifically, includes a base, a region, a territory, a group, a character, a card, an item, a building, a vehicle, and the like. The "host object" refers to, for example, an object managed by the player. The "enemy object" refers to, for example, an object that is managed by other than the player and is an execution target of the predetermined action.

In the first embodiment, for example, the "predetermined action" may exert any effect and/or action on the enemy object and more specifically, includes a physical attack, a magical attack, an attack decreasing attack power, an attack decreasing defense power, and the like.

In the first embodiment, for example, the "battle game" is a game in which competition for winning and losing with another player and/or an opponent controlled by the program is performed through the server apparatus. The "game program" refers to, for example, a program executed by the server apparatus for executing the game.

In the first embodiment, for example, a "predetermined host object" refers to a host object predetermined by the player or the program and more specifically, is a capital in a case where the object is the base, a leader character in a case where the object is the character, or the like.

In the first embodiment, for example, the "predetermined first relationship" refers to a relationship in which objects arranged in a virtual space have an adjacent positional relationship, and more specifically, includes relationships such as connection through a path, contact, and proximity. The "predetermined second relationship" refers to, for example, a relationship of connection to the predetermined host object in the case of traversing the second object having the predetermined first relationship like another second object having the predetermined first relationship with a certain second object or furthermore, still another second object having the predetermined first relationship with the second object in the positional relationship between the objects arranged in the virtual space. More specifically, the predetermined second relationship is a relationship of $\alpha$-$\beta 1$-$\beta 2$- . . . -$\gamma$ when the certain second object is denoted by $\alpha$, the other second objects are denoted by $\beta 1$, $\beta 2$, . . . , the predetermined host object is denoted by $\gamma$, and the predetermined first relationship is denoted by.

Second Embodiment

Next, a summary of a second embodiment of the present invention will be described. Hereinafter, a game program causing a server apparatus to execute a battle game that progresses by executing a predetermined action on an enemy object in the server apparatus capable of connecting to and communicating with a terminal apparatus operated by a player will be illustratively described.

A configuration of the server apparatus in the second embodiment can employ the same configuration as illustrated in the block diagram of FIG. 1. Furthermore, a flow of program execution process in the second embodiment can employ the same configuration as illustrated in the flowchart of FIG. 2.

In the second embodiment, the enemy object can turn into the host object in a case where the predetermined action is executed on the enemy object and a predetermined condition is satisfied.

As one aspect of the second embodiment, by enabling the enemy object to turn into the host object in a case where the predetermined action is executed on the enemy object and the predetermined condition is satisfied, the interest of the game such as increasing the number of possessed host objects can be provided.

In the second embodiment, each of the "terminal apparatus", the "server apparatus", the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

In the second embodiment, for example, the "predetermined condition" refers to a winning condition in a combat between the host object and the enemy object.

In the second embodiment, for example, a "predetermined enemy object" refers to an enemy object predetermined by the player or the program and more specifically, is a capital in a case where the object is the base, a leader character in a case where the object is the character, or the like.

Third Embodiment

Next, a summary of a third embodiment of the present invention will be described. Hereinafter, a game program causing a server apparatus to execute a battle game that progresses by executing a predetermined action on an enemy object in the server apparatus capable of connecting to and communicating with a terminal apparatus operated by a player will be illustratively described.

Figure 3:
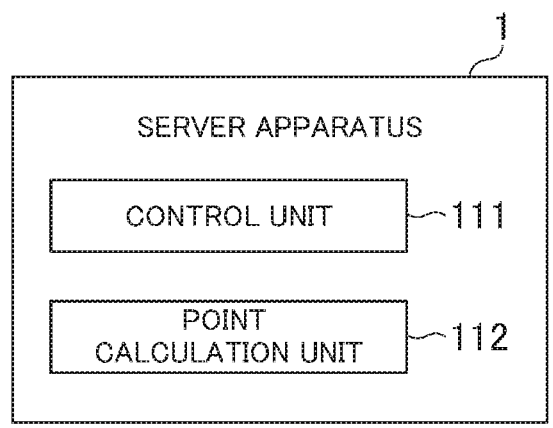
FIG. 3 is a block diagram illustrating a configuration of a server apparatus corresponding to at least one embodiment of the present invention.

FIG. 3 is a block diagram illustrating a configuration of a server apparatus corresponding to at least one embodiment of the present invention. The server apparatus 1 includes at least a control unit 111 and a point calculation unit 112.

The control unit 111 has a function of controlling the predetermined action to be executable on one enemy object in a case where one or more host objects having a predetermined first relationship with the one enemy object is/are present and any of the host objects is a first object, and a case where the one or more host objects having the predetermined first relationship with the one enemy object is/are present and any of the host objects is a second object having a predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object.

The point calculation unit 112 has a function of calculating a point involved in winning and losing of the game in accordance with the number of second objects having the predetermined second relationship with the first object and the number of second enemy objects having the predetermined second relationship with a first enemy object.

Figure 4:
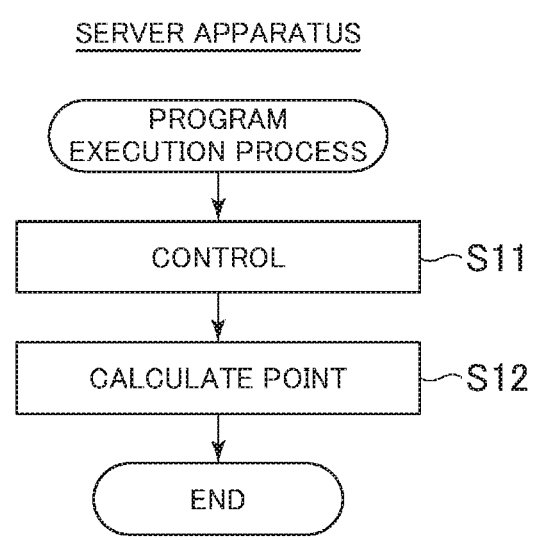
FIG. 4 is a flowchart of a program execution process corresponding to at least one embodiment of the present invention.

A program execution process in the third embodiment of the present invention will be described. FIG. 4 is a flowchart of a program execution process corresponding to at least one embodiment of the present invention.

The server apparatus 1 controls the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controls the predetermined action to be non-executable on the one enemy object in a case where the host objects having the predetermined first relationship with the one enemy object is/are not present, and a case where none of the host objects having the predetermined first relationship with the one enemy object is the first object or the second object having the predetermined second relationship with the first object (step S11). In addition, the server apparatus 1 calculates the point involved in winning and losing of the game in accordance with the number of second objects having the predetermined second relationship with the first object and the number of second enemy objects having the predetermined second relationship with the first enemy object (step S12), and terminates the program execution process.

As one aspect of the third embodiment, by calculating the point involved in winning and losing of the game in accordance with the number of second objects having the predetermined second relationship with the first object and the number of second enemy objects having the predetermined second relationship with the first enemy object, not only the number of possessed objects but also arrangement of host objects and enemy objects is prioritized in terms of strategy, and the interest of the game can be improved.

In the third embodiment, each of the "terminal apparatus", the "server apparatus", the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

In the third embodiment, for example, the "point" refers to information on a numerical value, a text, a symbol, or a combination thereof involved in winning and losing of the game.

Fourth Embodiment

Next, a summary of a fourth embodiment of the present invention will be described. Hereinafter, a game program causing a server apparatus to execute a battle game that progresses by executing a predetermined action on an enemy object in the server apparatus capable of connecting to and communicating with a terminal apparatus operated by a player will be illustratively described as the fourth embodiment of the present invention.

Figure 5:
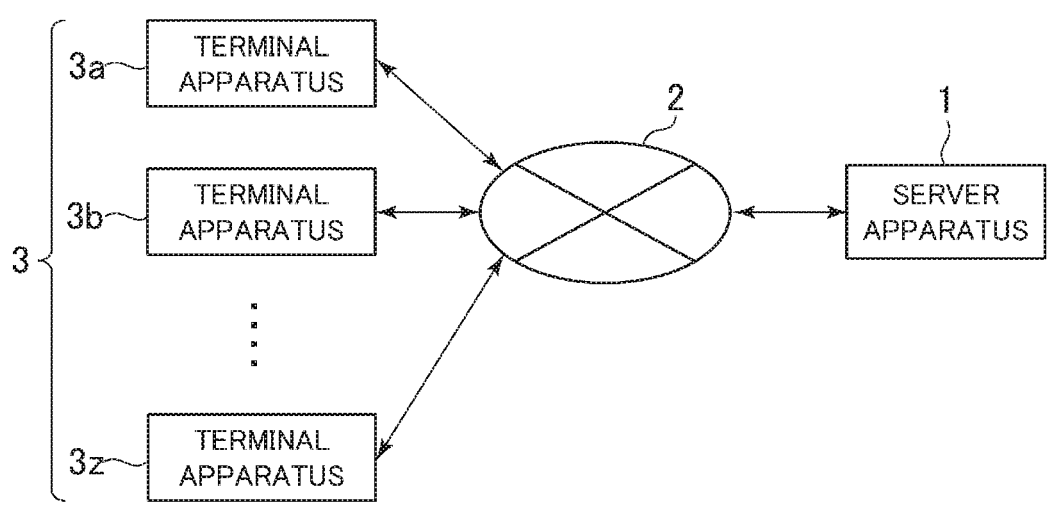
FIG. 5 is a block diagram illustrating a configuration of a game system corresponding to at least one embodiment of the present invention.

FIG. 5 is a block diagram illustrating a configuration of a game system corresponding to at least one embodiment of the present invention. As illustrated, the game system is configured with a plurality of terminal apparatuses 3 (terminal apparatuses 3a, 3b, . . . , 3z) operated by a plurality of players (players A, B, . . . , Z), the server apparatus 1, and a communication network 2. The terminal apparatuses 3 are connected to the server apparatus 1 through the communication network 2. The terminal apparatuses 3 may not be connected to the server apparatus 1 at all times or may be able to be connected as necessary.

Figure 6:
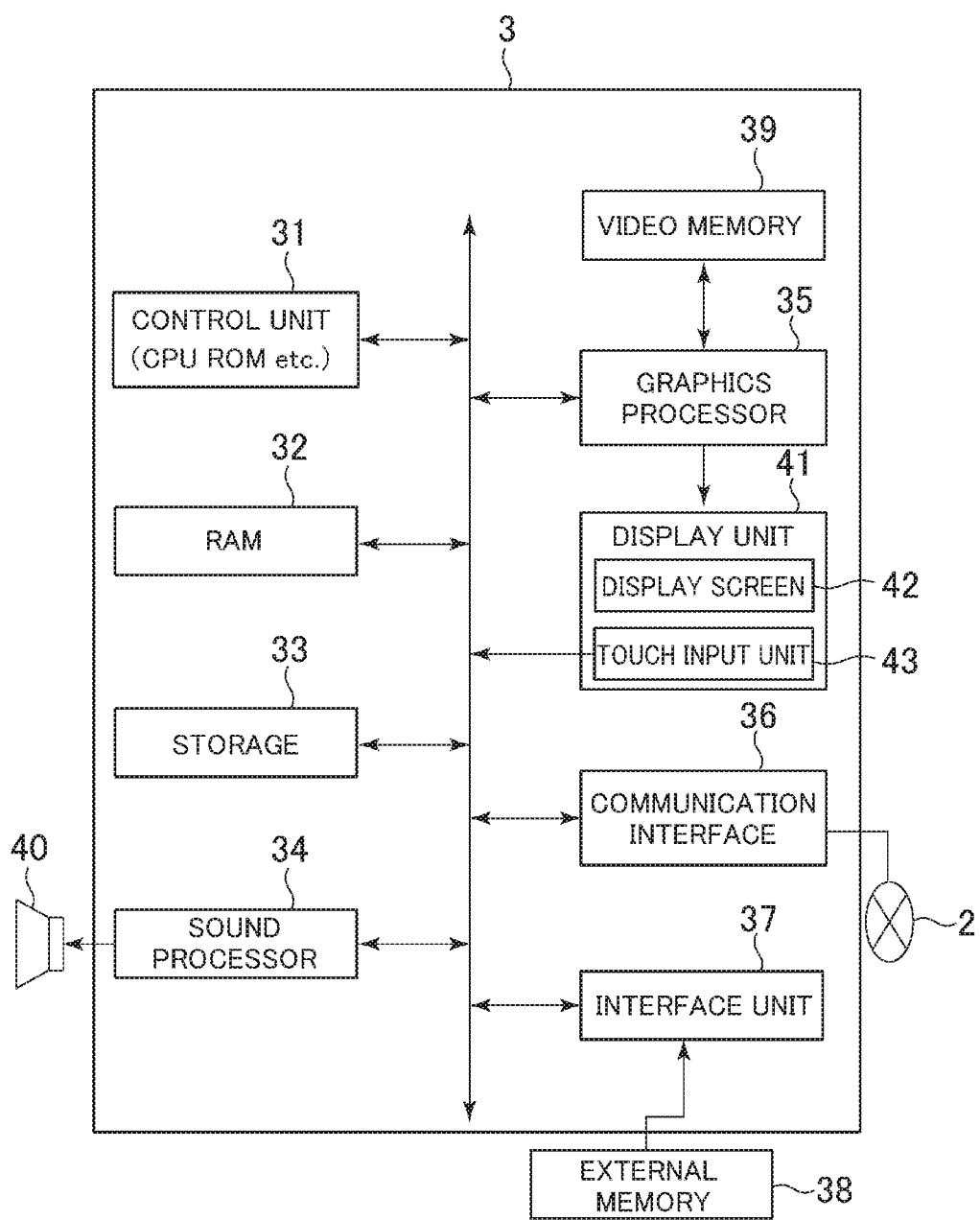
FIG. 6 is a block diagram illustrating a configuration of a terminal apparatus corresponding to at least one embodiment of the present invention.

FIG. 6 is a block diagram illustrating a configuration of a terminal apparatus corresponding to at least one embodiment of the present invention. The terminal apparatus 3 comprises a control unit 31, a random access memory (RAM) 32, a storage 33, a sound processor 34, a graphics processor 35, a communication interface 36, and an interface unit 37 that are connected to each other through an internal bus.

The control unit 31 is configured with a central processing unit (CPU) and a read only memory (ROM). The control unit 31 executes a program stored in the storage 33 and controls the terminal apparatus 3. The RAM 32 is a work area of the control unit 31. The storage 33 is a storage region for storing the program (including the game program) and data (including game data).

The control unit 31 reads and processes the program and the data from the RAM 32. The control unit 31 outputs a sound output instruction to the sound processor 34 and outputs a drawing command to the graphics processor 35 by processing the program and the data loaded in the RAM 32.

The sound processor 34 is connected to a sound output device 40 that is a speaker. In a case where the control unit 31 outputs the sound output instruction to the sound processor 34, the sound processor 34 outputs a sound signal to the sound output device 40.

The graphics processor 35 is connected to a display unit 41. The display unit 41 has a display screen 42 and a touch input unit 43 receiving an input by contact of the player with the display unit. In a case where the control unit 31 outputs the drawing command to the graphics processor 35, the graphics processor 35 loads an image into a video memory (frame buffer) 39 and outputs a video signal for displaying the image on the display screen 42.

The touch input unit 43 may be capable of detecting the position of contact using any method such as a resistive film method, an electrostatic capacitive method, an ultrasonic surface acoustic wave method, an optical method, or an electromagnetic induction method used in a touch panel. The touch input unit 43 is a device that can detect the position of a finger or the like in a case where an operation such as press or movement is performed on the upper surface of the touch input unit 43 using the finger, a stylus, or the like.

The graphics processor 35 executes drawing of one image in units of frames. The time period of one frame of the image is, for example, a 30th of one second. The graphics processor 35 has a role of distributing the load of the entire system by taking over a part of a calculation process related to drawing performed by only the control unit 31.

An external memory 38 (for example, an SD card) is connected to the interface unit 37. Data read from the external memory 38 is loaded into the RAM 32, and a calculation process is executed on the data by the control unit 31.

The communication interface 36 can connect to the communication network 2 in a wireless or wired manner and can receive data through the communication network 2. Like the data read from the external memory 38, the data received through the communication interface 36 is loaded into the RAM 32, and the calculation process is performed on the data by the control unit 31.

Figure 7:
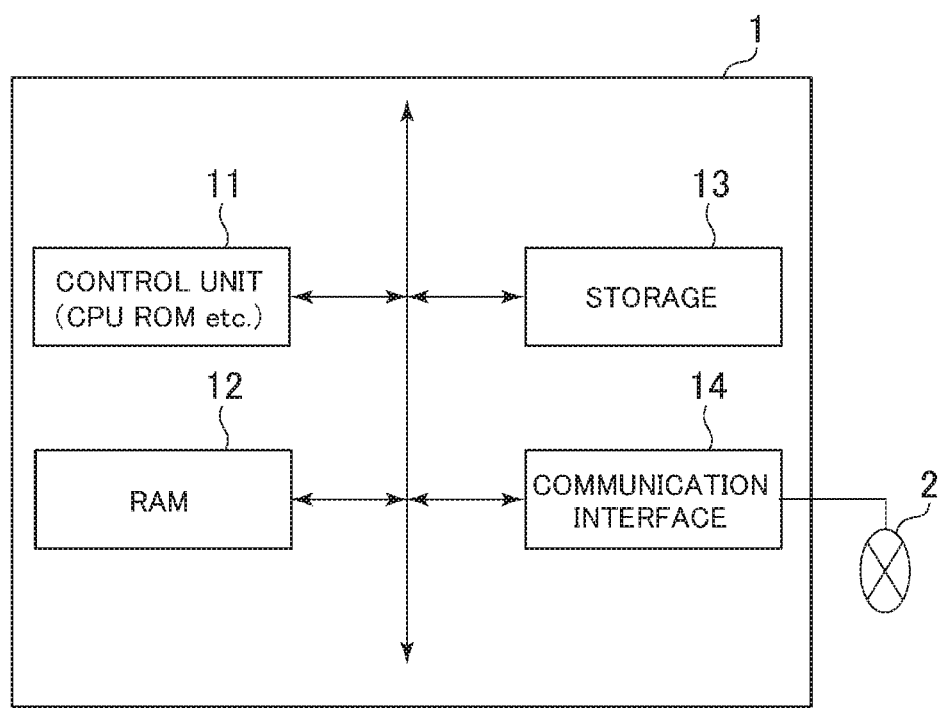
FIG. 7 is a block diagram illustrating a configuration of a server apparatus corresponding to at least one embodiment of the present invention.

FIG. 7 is a block diagram illustrating a configuration of a server apparatus corresponding to at least one embodiment of the present invention. The server apparatus 1 includes a control unit 11, a RAM 12, a storage 13, and a communication interface 14 that are connected to each other through an internal bus.

The control unit 11 is configured with a CPU and a ROM and controls the server apparatus 1 by executing a program stored in the storage 13. In addition, the control unit 11 includes an internal timer that tracks time. The RAM 12 is a work area of the control unit 11.

The storage 13 is a storage region for storing the program (including the game program) and data (including game data). The control unit 11 reads the program and the data from the RAM 12 and performs a program execution process based on request information received from the terminal apparatus 3.

Figure 8:
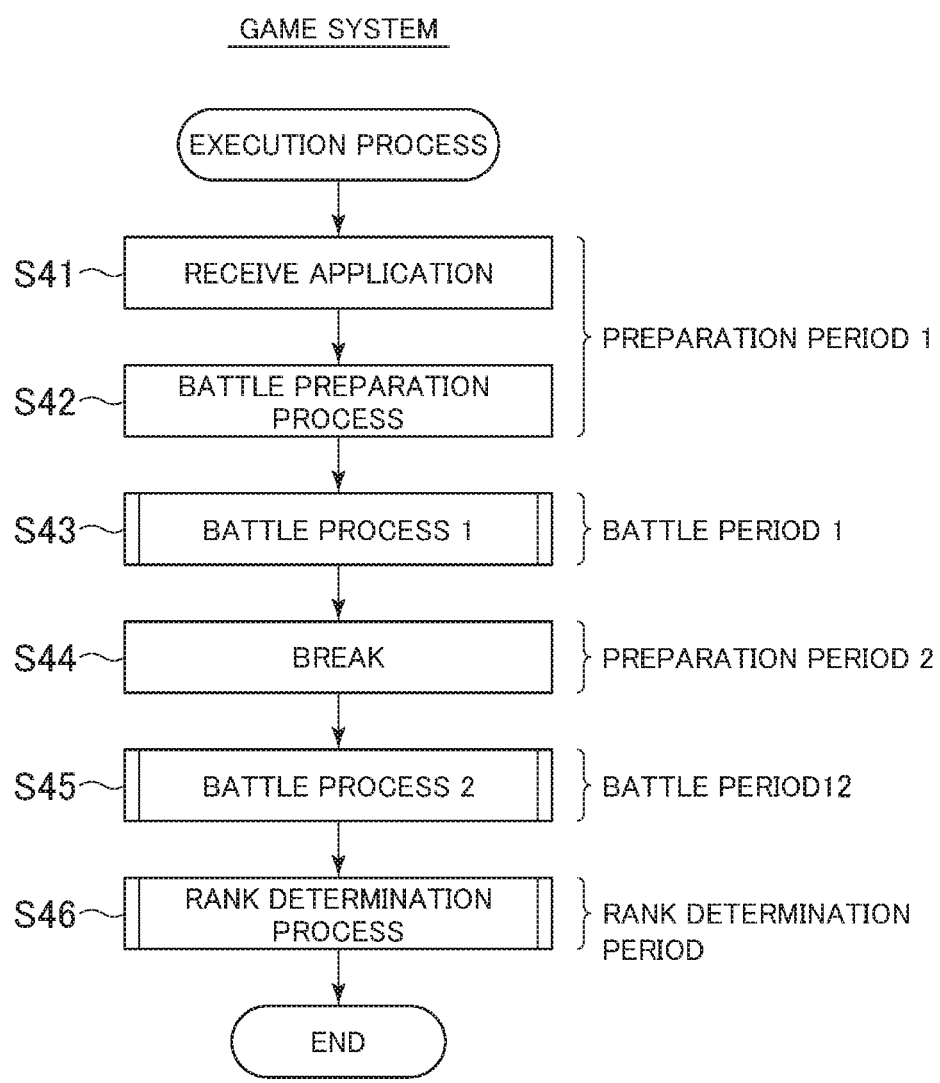
FIG. 8 is a flowchart of an execution process of a game system corresponding to at least one embodiment of the present invention.

Next, an execution process of the game system in the fourth embodiment of the present invention will be described. FIG. 8 is a flowchart of an execution process of a game system corresponding to at least one embodiment of the present invention.

Summary of Battle Game

In the fourth embodiment of the present invention, for example, a game of battle in which a plurality of players participate, divide into several groups, and acquire a point by increasing the number of bases of a host group is exemplified. A battle finish condition for finishing the battle may be an elapse of a predetermined time period from the start of the battle or acquisition of predetermined points by any group during the battle. A group that has acquired the most points when the predetermined time period has elapsed from the start of the battle may win, or a group that has acquired the predetermined points during the battle may win.

A game system 4 includes the terminal apparatus operated by the player and the server apparatus capable of communicating with and connecting to the terminal apparatus. First, the game system 4 receives an application to participate in the battle (step S41). Next, the game system 4 performs a battle preparation process (step S42). The game system 4 performs battle process 1 in a case where a predetermined battle start time is reached (step S43). Next, the game system 4 sets a break time period (step S44). The game system 4 performs subsequent battle process 2 (step S45). The time period of the battle process and the break time period are predetermined. A rank determination process is performed based on the results of battle processes 1 and 2 (step S46), and the process is terminated. Hereinafter, a period in which step S41 and step S42 are performed will be referred to as preparation period 1. A period in which step S43 is performed will be referred to as battle period 1. A period in which step S44 is performed will be referred to as preparation period 2. A period in which step S45 is performed will be referred to as battle period 2. A period in which step S46 is performed will be referred to as a rank determination period. In the game system 4, broadly three major periods including the battle period, the preparation period, and the rank determination period may be included, and the battle period and the preparation period may be set once or more.

Preparation Period 1

In the fourth embodiment, for example, the player belongs to a group that is referred to as a guild and is configured with one or more players. A plurality of guilds are present, and the player belongs to one of the guilds. A member belonging to the guild may be another player through the network or a character controlled by the program. The application to participate in the battle is made in units of guilds. In step S41, any player belonging to the guild makes the application to participate in the battle.

For example, the battle is set to be a competition among three guilds. In step S42, guilds to fight with each other among guilds making the application to participate in the battle are determined. In a case where the battle has to be started in a situation where three guilds are not available according to the number of guilds making the application, the battle may be set to be a competition between two guilds. In the case of the competition between two guilds, the battle may be performed between only two guilds, or the battle may be performed among three guilds by causing a guild controlled by the program to participate in the battle. In a case where a combination of guilds to perform the battle is determined, arrangement of bases of each guild is determined. It is also possible to set four or more guilds to fight. In addition, a battle power value representing strength or the like may be set for each guild, and guilds having similar battle power values may battle.

Figure 9:
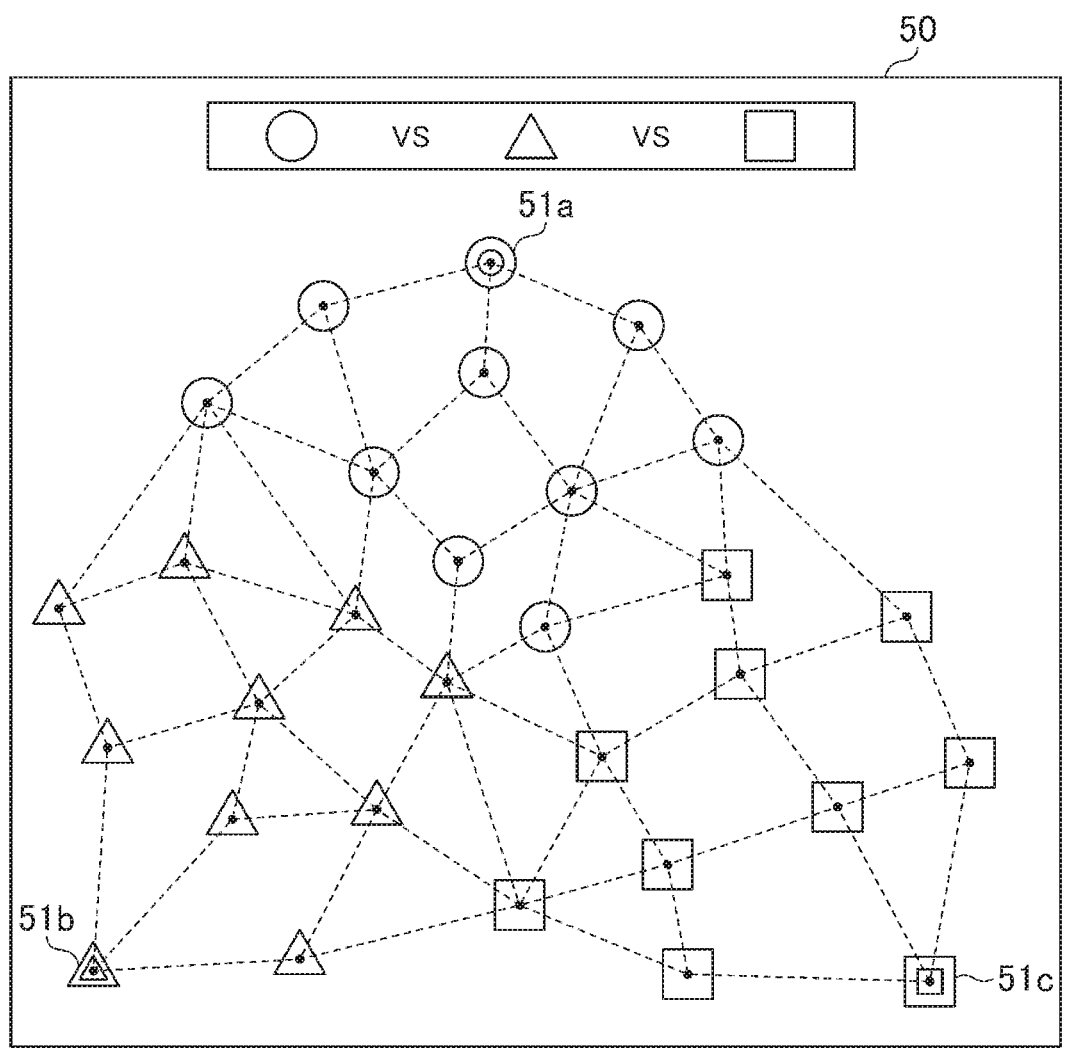
FIG. 9 is an example of an execution screen of a game system corresponding to at least one embodiment of the present invention.

FIG. 9 is an example of an execution screen of a game system corresponding to at least one embodiment of the present invention in a state where the arrangement of the bases of each guild is determined. In an execution screen 50, equal numbers of bases are assigned to three guilds, and bases surrounded by a mark ○, Δ, or □ correspond to the bases possessed by each guild. Bases possessed by the same guild are displayed with the same mark and/or color. One capital (a capital 51a, a capital 51b, and a capital 51c) is present among the bases of each guild. A mark of the capital can be displayed differently from the other marks. Arrangement of the capital may not be changed until the end of execution of the game system 4 or may be changed for each preparation period. A dotted line connecting the bases in the battle represents a path, and only the bases connected through the path are adjacent. In a case where the number of guilds to fight is two, the present bases may be allocated to two guilds. Alternatively, the same number of bases as in a case where three guilds participate may be assigned, and the remaining bases may be set as vacant bases not belonging to any guild.

During the preparation period in step S41 and step S42, a defense deck can be arranged in a host base. The deck is a combination of character cards possessed by the player. Any defense deck arranged in the base performs a combat in a case where the base is attacked from an enemy. The player may arrange a defense deck registered in advance in the capital in each host base or may newly form and arrange the defense deck in each host base. Information related to the character card possessed by the player is stored in the storage 33. In the character card, numerical values representing performance and/or characteristics such as physical strength, attack power, defense power, agility, and an attribute may be set. The number of cards included in the deck may be any number greater than or equal to one. For example, three character cards may be included in one deck. The number of defense decks arranged in the base may be any number greater than or equal to one. In addition, the defense deck may not be arranged in the base. For example, five decks may be arranged in one base.

Battle Period 1

Figure 10:
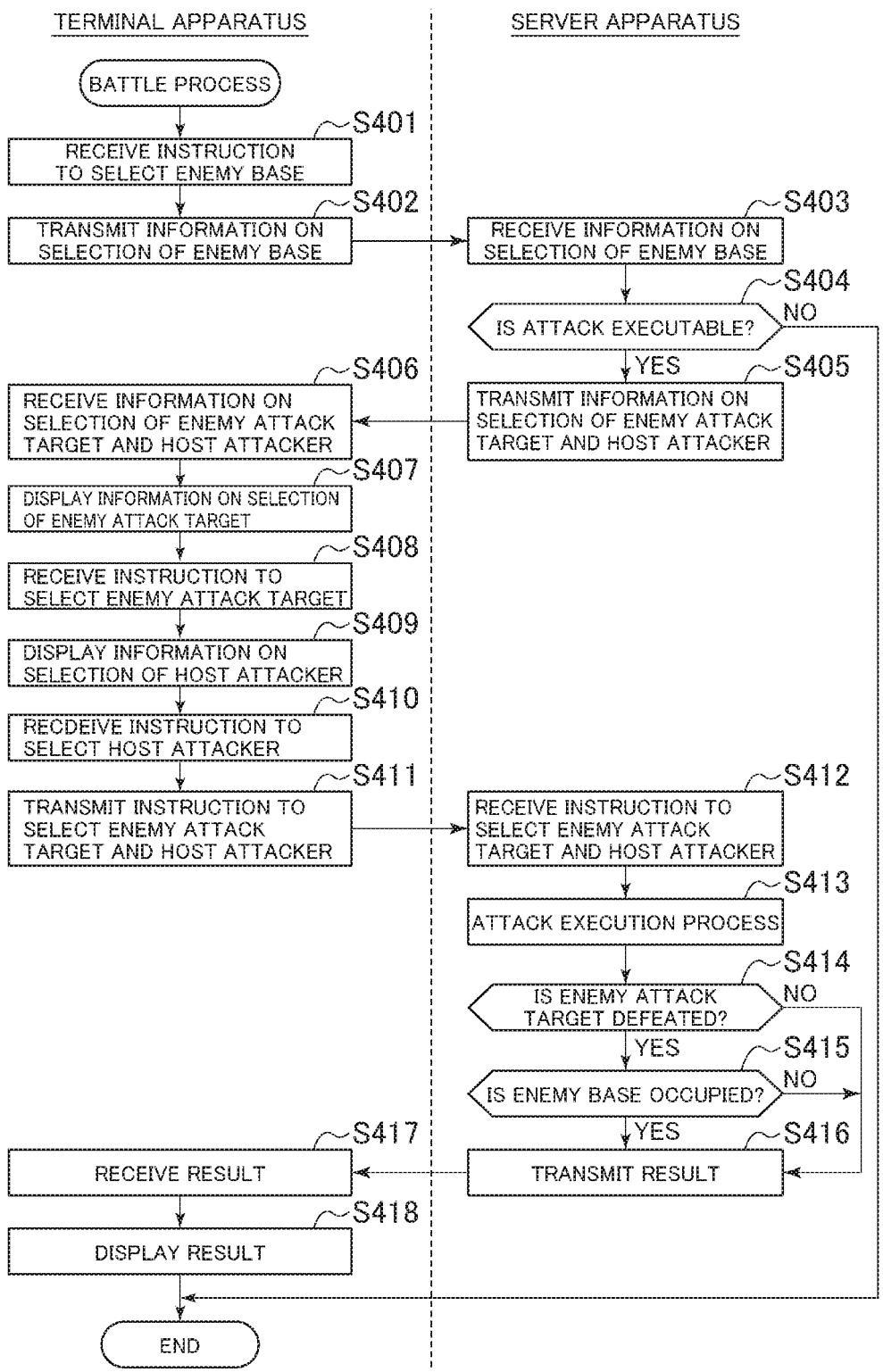
FIG. 10 is a flowchart of a battle process corresponding to at least one embodiment of the present invention.

In step S43, the battle process is performed. FIG. 10 is a diagram representing a flowchart of a battle process corresponding to at least one embodiment of the present invention.

In a case where the battle is started, the player can select an enemy base of an attack target in the terminal apparatus (step S401). Information on the enemy base selected by the player is transmitted to the server apparatus from the terminal apparatus (step S402). The information on the enemy base selected by the player is received in the server apparatus (step S403). In a case where attack is controlled to be non-executable in the server apparatus (No in step S404), the battle process is terminated. In a case where attack is controlled to be executable in step S404 (Yes in step S404), information on defense decks selectable as the attack target in the enemy base and information on character cards for battling with the defense deck are transmitted to the terminal apparatus from the server apparatus (step S405). The information on the defense decks selectable as the attack target in the enemy base and the information on the character cards for battling with the defense deck are received in the terminal apparatus (step S406). Next, the defense decks that are selectable as the attack target and are arranged in the enemy base are displayed on the display unit 41 of the terminal apparatus (step S407). The player selects one of the defense decks arranged in the enemy base (step S408). Then, the information on the character cards for the combat with the defense deck is displayed (step S409). The player creates a host attack deck for the combat with the defense deck (step S410). Then, information on selection of the defense deck of the enemy and the host attack deck is transmitted to the server apparatus from the terminal apparatus (step S411). The information on the selection of the defense deck of the enemy and the host attack deck is received in the server apparatus (step S412). Next, the combat in the base is performed (step S413). When the combat is finished, a result is transmitted to the terminal apparatus from the server apparatus (step S416). The result is received in the terminal apparatus (step S417). The received result is displayed on the display unit 41 of the terminal apparatus (step S418), and the process is terminated.

The displayed result is changed depending on whether or not the physical strength or troop strength of the cards included in the defense deck of the enemy becomes zero (step S414). The displayed result is also changed depending on whether or not the physical strength or troop strength of the cards included in all defense decks arranged in the enemy base becomes zero (step S415). In a case where the physical strength or troop strength of the cards included in the defense deck of the enemy becomes zero, the result is winning in the combat. In a case where the physical strength or troop strength of the cards included in all defense decks arranged in the enemy base becomes zero, the result is occupation of the enemy base.

The combat performed in the base may be a turn-based battle that progresses by causing the characters included in the defense deck to alternately attack, may be a battle based on the total evaluation of the strength of the characters included in the deck, or may be a battle based on a puzzle or a quiz. The defense deck performing the combat may be displayed as "in combat" and may not be selected as the attack target from another player.

In a case where the enemy base is occupied, the enemy base turns into the host base and is not set as the attack target from the enemy until an elapse of a predetermined time period. In the meantime, the defense deck can be arranged in the newly possessed host base. Among bases, a base that exerts an additional effect advantageous for the combat in terms of performance and/or characteristics on the character cards possessed by the player for a predetermined time period in a case where the player occupies the base may be present. The defense deck arranged in the occupied base may be automatically returned to the capital and be arranged as the defense deck of the capital.

When the battle period is started, a new base not belonging to any guild may be generated, and an additional effect disadvantageous for the combat in terms of performance and/or characteristics may be exerted on the cards of the defense deck arranged in a base adjacent to the base for a predetermined time period. One base of a target on which the additional effect disadvantageous for the combat is exerted may be randomly selected from bases adjacent to the new base not belonging to any guild. Selection of the base of the target on which the additional effect disadvantageous for the combat is exerted may be performed at predetermined time intervals.

Hereinafter, control for executability of attack in step S404 will be described with reference to FIGS. 11A and 11B, FIG. 12, and FIG. 13.

Figure 11:
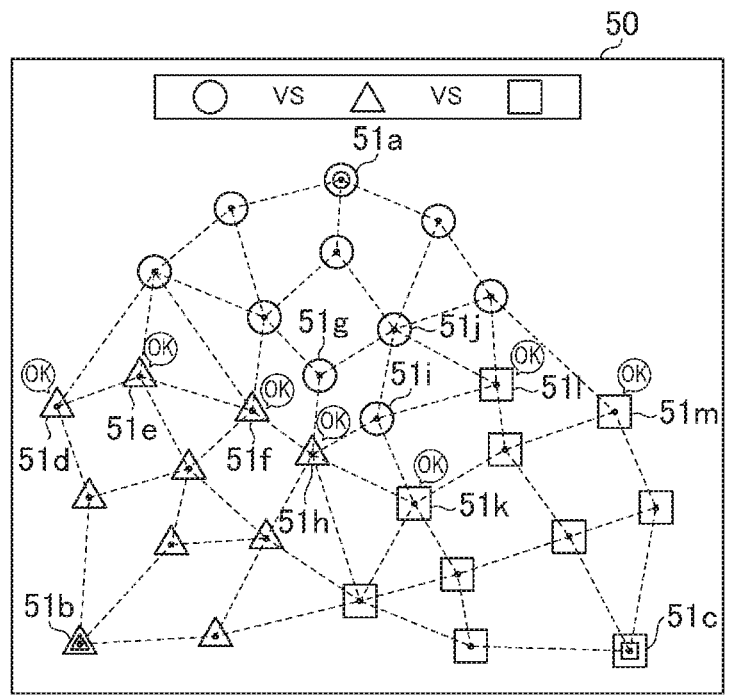
FIGS. 11A and 11B are examples of an execution screen of a game system corresponding to at least one embodiment of the present invention
Figure 11:
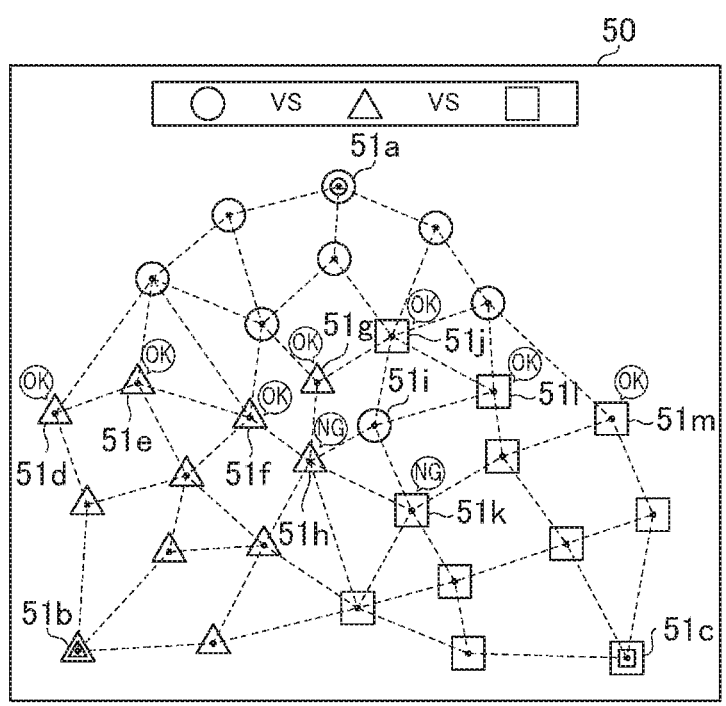

FIGS. 11A and 11B are examples of an execution screen of a game system corresponding to at least one embodiment of the present invention at the time of selecting the enemy base. In the execution screen 50 in FIG. 11A, in a case where a host guild sets a base 51a as the capital, bases surrounded by the mark ○ is set as the host base, and bases surrounded by the mark Δ and the mark □ are set as the enemy base. Host bases connected to enemy bases of a base 51d, a base 51e, a base 51f, a base 51h, a base 51k, a base 51l, and a base 51m through paths are connected to the capital by traversing host bases connected to the host bases through paths. Thus, attack on the enemy bases is controlled to be executable, and the enemy bases can be selected as the attack target. However, in a case where a base 51g and a base 51j are occupied by the enemy and the arrangement of the bases possessed by each guild is changed as illustrated in FIG. 11B, a host base 51i connected to the enemy bases of the base 51h and the base 51k through paths is not connected to the capital even in the case of traversing host bases connected to the host bases through paths. Consequently, attack on the enemy bases is controlled to be non-executable, and the enemy bases cannot be selected as the attack target. Step S404 may be performed at any timing during the execution process of the game system. For example, step S404 may be performed when the player selects the enemy base, may be performed at predetermined time intervals such as once in every 0.1 seconds or once in every 30 minutes during the battle period, or may be performed at the start of the battle. In addition, at a timing at which the arrangement of the bases possessed by each guild is changed, display of the color or the like of bases may be changed such that bases selectable as the attack target and bases non-selectable as the attack target are differently seen. In a case where the player selects a base non-selectable as the attack target, an error sound or the like may be output.

Figure 12:
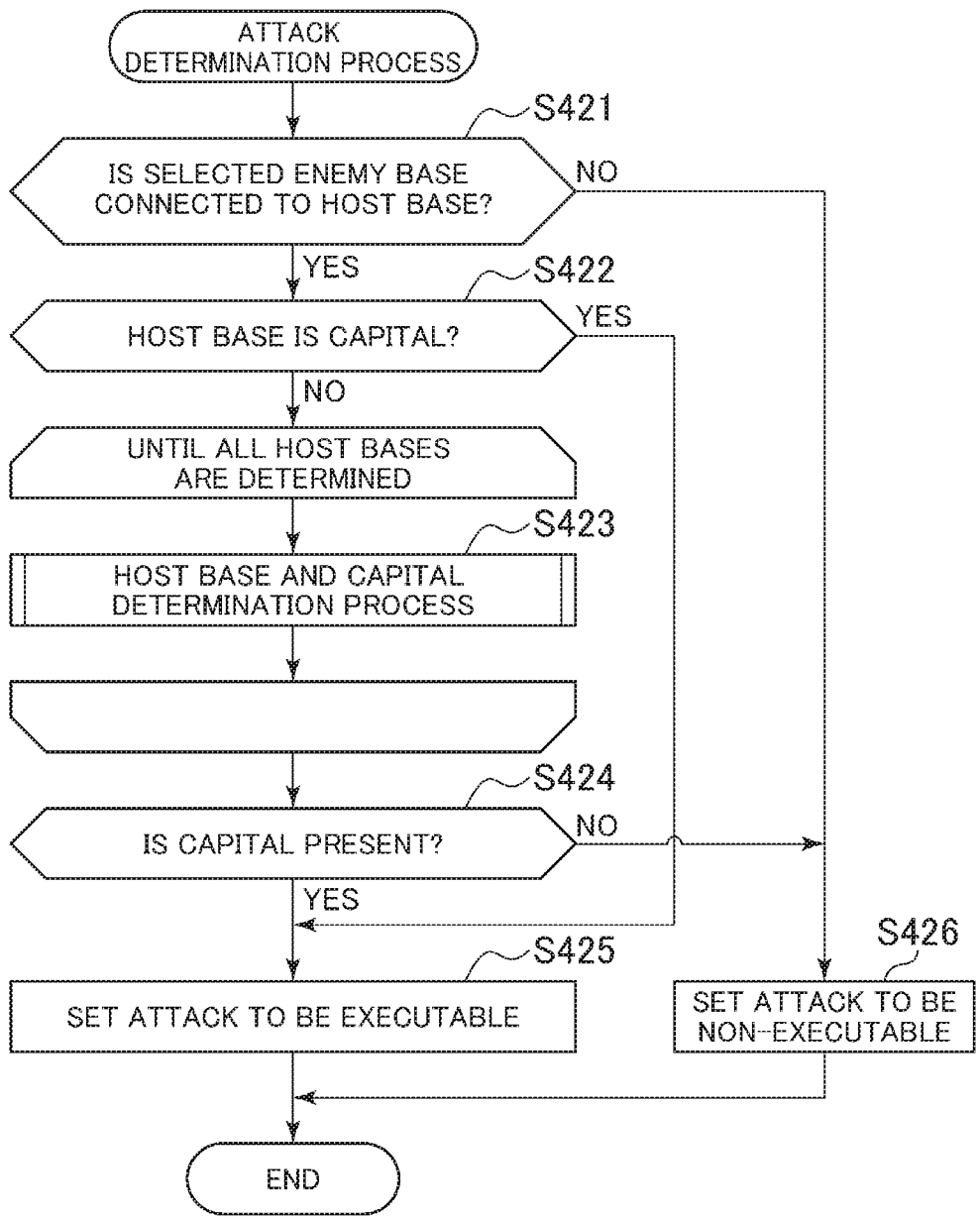
FIG. 12 is a diagram representing a flowchart of an attack determination process corresponding to at least one embodiment of the present invention.

FIG. 12 is a diagram representing a flowchart of an attack determination process corresponding to at least one embodiment of the present invention at the time of selecting the enemy base. In the server apparatus, in a case where information on selection of the enemy base is received, a determination as to whether or not the enemy base is connected to a host base through a path is performed (step S421). In a case where the enemy base is not connected to a host base through a path (No in step S421), attack on the enemy base is controlled to be non-executable (step S426), and the enemy base cannot be selected as the attack target. In a case where the enemy base is connected to a host base through a path (Yes in step S421), a determination as to whether or not the host base is the capital is performed (step S422). In a case where the host base is the capital (Yes in step S422), attack on the enemy base is controlled to be executable (step S425). In a case where the host base is not the capital (No in step S422), a host base and capital determination process (step S423) of determining whether or not the capital is present among host bases connected to the host base through paths is repeated until all host bases are determined. As a result of the host base and capital determination process, in a case where the capital is present during traversing of the host bases connected to the enemy base through paths (Yes in step S424), attack on the enemy base is controlled to be executable (step S425). In a case where the capital is not present during traversing of the host bases connected to the enemy base through paths (No in step S424), attack on the enemy base is controlled to be non-executable (step S426).

Figure 13:
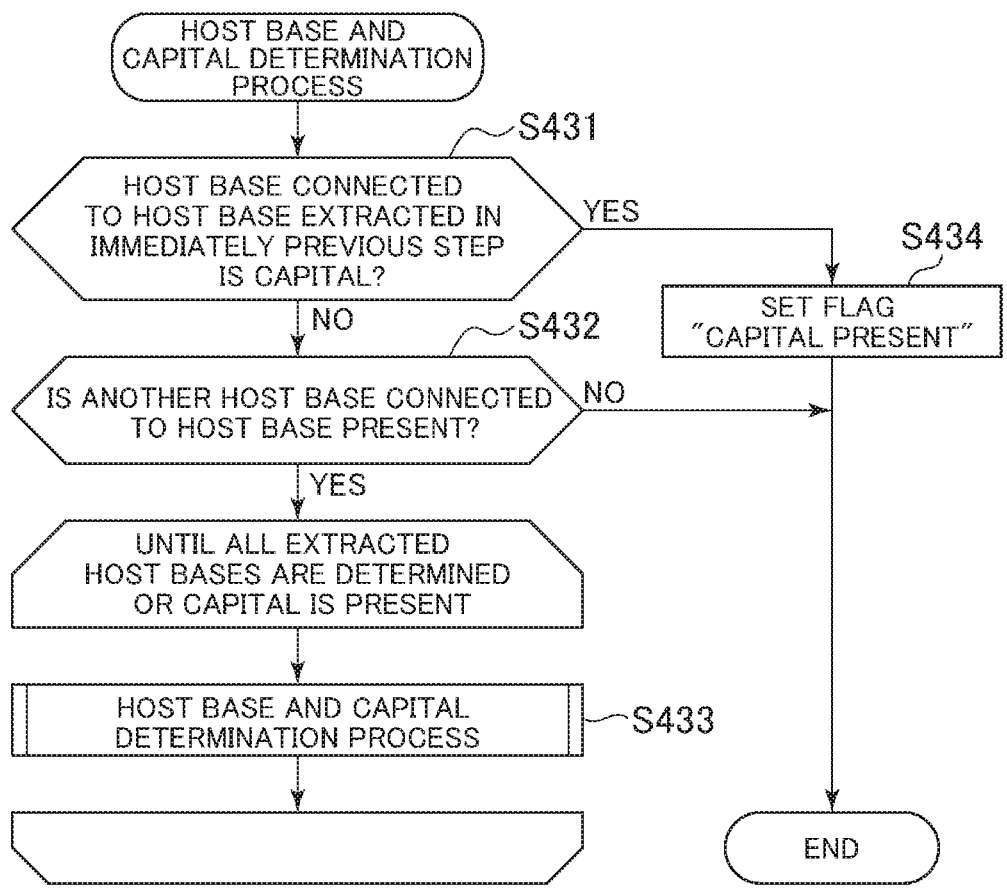
FIG. 13 is a diagram representing a flowchart of a host base and capital determination process corresponding to at least one embodiment of the present invention.

FIG. 13 is a diagram representing a flowchart of a host base and capital determination process corresponding to at least one embodiment of the present invention. In the host base and capital determination process, first, a determination as to whether or not a host base connected to the host base extracted in the immediately previous step through a path is the capital is performed (step S431). In a case where the host base is the capital, a flag "capital present" is set (step S434), and the process is terminated. In a case where the host base is not the capital, a determination as to whether or not there is another host base connected to the host base through a path is performed, and the host base is extracted (step S432). In step S432, in a case where the extracted host base is not present, (No in step S432), the process is terminated. In step S432, in a case where the extracted host base is present (Yes in step S432), the host base and capital determination process is repeated from step S431 until all host bases are determined or the capital is present among the host bases (step S433). In a case where the flag "capital present" is set and the process is terminated, it is determined that the capital is present in step S424. In a case where the flag "capital present" is not set and the process is terminated, it is determined that the capital is not present in step S424.

During the battle period, step S43 may be executed a plurality of times. For example, the combat in the enemy base may be executed 10 times per player, may not be executed even once, or may be executed once or a plurality of times.

During the battle period, the defense deck arranged in the base may be set to be not movable.

Preparation Period 2

In a case where the battle period is finished, a break is interposed as the preparation period (step S44). Even in step S44, the defense deck can be arranged in the host base. In addition, the defense deck arranged in the base may be moved.

Battle Period 2

In battle period 2, battle process 2 in step S45 is performed. In step S45, the same process as the flowchart illustrated in FIG. 10 is performed. Arrangement of the bases at the start of battle period 2 may be arrangement of the bases at the end of battle period 1 or may be new arrangement of the bases. Step S45 may be performed a plurality of times during the battle period.

The battle period may be set any number of times during execution of the game system and, for example, is set twice.

Rank Determination Period

Figure 14:
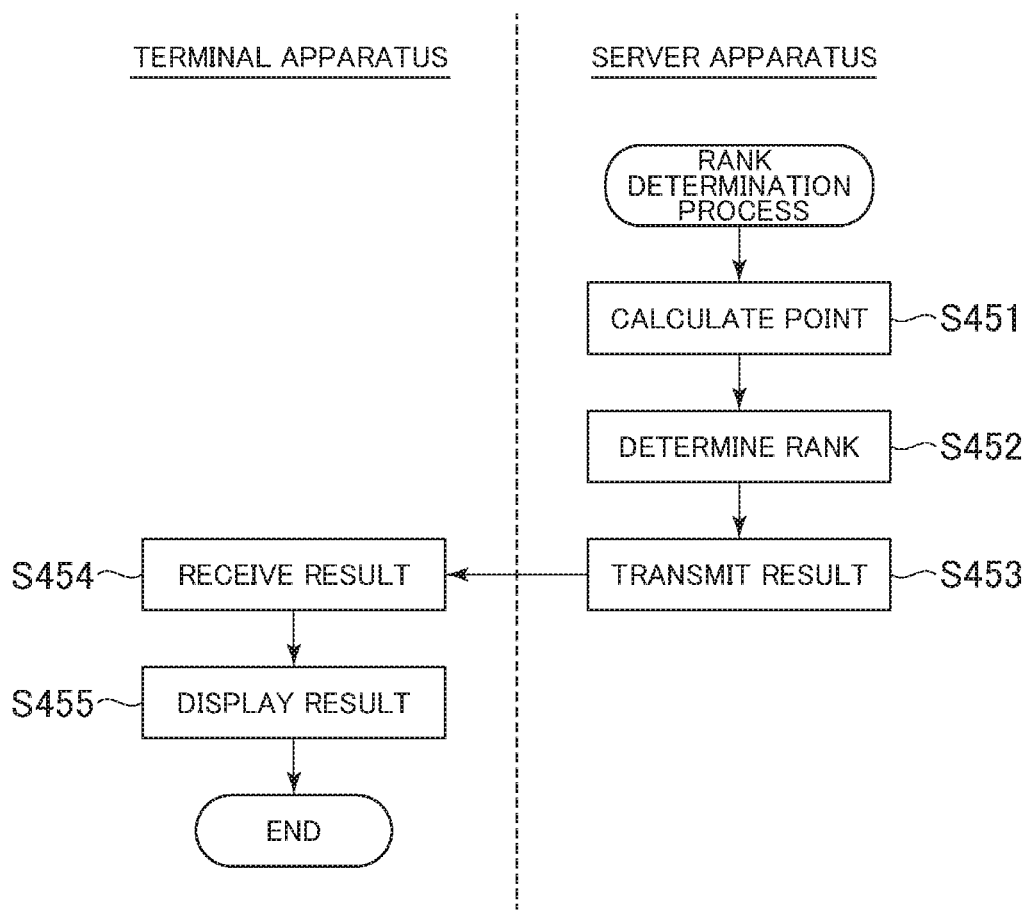
FIG. 14 is a flowchart of a rank determination process corresponding to at least one embodiment of the present invention.

Next, the rank determination process in the fourth embodiment of the present invention will be described. FIG. 14 is a flowchart of a rank determination process corresponding to at least one embodiment of the present invention.

Figure 15:
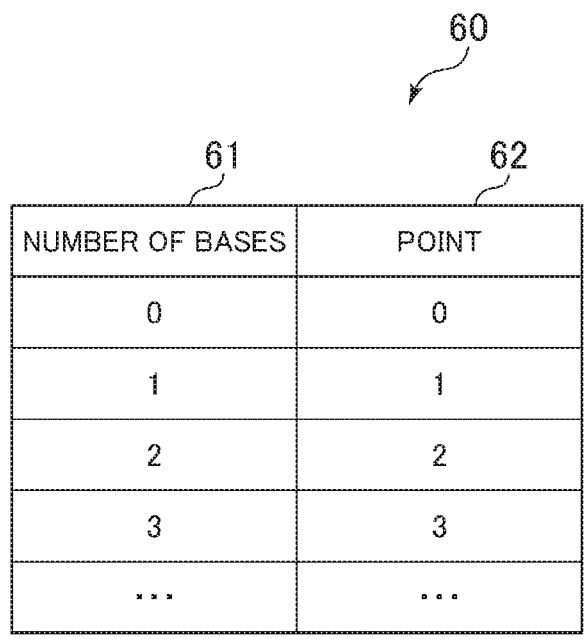
FIG. 15 is a point master table corresponding to at least one embodiment of the present invention.

In a case where the battle period is finished, the point is calculated based on the number of possessed bases and/or a possession time period of each guild in the server apparatus (step S451). FIG. 15 is a point master table corresponding to at least one embodiment of the present invention. In a point master table 60, a point 62 is stored in association with a number of bases 61. The point 62 corresponding to the number of bases 61 is specified with reference to the point master table 60 in accordance with the number of bases possessed by each guild at the end of the battle. The point may be calculated in proportion to the number of possessed bases, or the point may be inclined in accordance with the importance of the base or may be added in accordance with the possession time period. For example, one point may correspond to a case where the number of possessed bases is 1 to 5, and two points may correspond to a case where the number of possessed bases is 6 to 10. The point may not be calculated for the host base that is possessed but is not connected to the capital by traversing the host bases connected through paths. The point may be calculated for the host base that is attacked from the enemy but is not occupied.

In a case where the point is calculated, a rank is determined in accordance with the acquired point of each guild (step S452). Next, a result is displayed on the display unit 41 of the terminal apparatus (step S455), and the process is terminated. For example, the first rank, the second rank, and the third rank are set in order from the guild acquiring the most points. A reward in virtual currency or the like usable in the game may be provided to each guild in accordance with the rank.

In the fourth embodiment, the applicable field of game is a game in which spatial arrangement of objects is changed like a strategy simulation game, a roll playing game, a fighting game, and a puzzle game and is not limited to the above description.

As one aspect of the fourth embodiment, by controlling the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object, a game program of sufficient interest having high strategic quality can be provided.

As one aspect of the fourth embodiment, by enabling the enemy object to turn into the host object in a case where the predetermined action is executed on the enemy object and the predetermined condition is satisfied, the interest of the game such as increasing the number of possessed host objects can be provided.

As one aspect of the fourth embodiment, by calculating the point involved in winning and losing of the game in accordance with the number of second objects having the predetermined second relationship with the first object and the number of second enemy objects having the predetermined second relationship with the first enemy object, not only the number of possessed objects but also arrangement of host objects and enemy objects is prioritized in terms of strategy, and the interest of the game can be improved.

As one aspect of the fourth embodiment, by not calculating the point for the second object not having the predetermined second relationship with the first object and not calculating the point for the second enemy object not having the predetermined second relationship with the first enemy object, the arrangement of the host objects and the enemy objects is prioritized in terms of strategy, and the interest of the game can be improved.

As one aspect of the fourth embodiment, by determining the rank based on the calculated point, motivation for gradually turning the enemy object into the host object while considering the arrangement of the host objects and the enemy objects is provided, and the interest of the game can be improved.

As one aspect of the fourth embodiment, by controlling the predetermined action to be non-executable on the enemy object until an elapse of the predetermined time period from satisfaction of the predetermined condition in a case where the predetermined action is executed on the enemy object and the predetermined condition is satisfied, preparation can be performed before the predetermined action is executed by the enemy.

As one aspect of the fourth embodiment, by arranging a defender in the host object for defending the object from the predetermined action, the strategic quality and the interest of the game such as reviewing the defender for not allowing the host object to be easily captured can be improved. For example, in a case where there is a difference in importance between the host objects due to the arrangement of the host objects, a stronger defender can be arranged in the host object having higher importance.

As one aspect of the fourth embodiment, by setting the battle game as a game in which a plurality of groups battle and configuring each group with a plurality of players, a battle having unexpectedness can be expected unlike a battle controlled by the program.

As one aspect of the fourth embodiment, by controlling the executability of the predetermined action in a case where the player selects the enemy object, the player can easily predict the executability of the predetermined action by recognizing the arrangement of the enemy objects and the host objects in the case of trying to select the enemy object.

As one aspect of the fourth embodiment, by controlling the executability of the predetermined action at the predetermined time intervals, the required strategic quality can be diversified. For example, in the case of control for once in every 0.1 seconds, a time lag between the time of selecting the predetermined action by the player and the time of controlling the executability of the predetermined action by a controller is reduced. Thus, the player is required to instantaneously read a battle situation that changes every moment. In the case of control for once in every 30 minutes, long-term strategic quality such as how to advantageously maneuver the battle situation during 30 minutes is required compared to the former.

As one aspect of the fourth embodiment, by configuring one or more battle periods and controlling the executability of the predetermined action at the start of the battle period, the arrangement of the enemy objects and the host objects at the start of the battle can be prioritized. For example, in a case where two or more battle periods are configured and the arrangement of the enemy objects and the host objects at the end of the immediately previous battle is reflected at the start of the subsequent battle, a game having high strategic quality such as preventing the host object not having the predetermined second relationship at the end of the immediately previous battle can be set.

In the fourth embodiment, each of the "terminal apparatus", the "server apparatus", the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

In the fourth embodiment, the "predetermined condition" and a "predetermined enemy object" can employ the contents disclosed in the second embodiment within a necessary range.

In the fourth embodiment, the "point" can employ the contents disclosed in the third embodiment within a necessary range.

In the fourth embodiment, the "predetermined time intervals" refer to repetition at approximately the same time intervals and refers to, for example, repetition at time intervals such as once in every 0.1 seconds or once in every 30 minutes.

Fifth Embodiment

Next, a summary of a fifth embodiment of the present invention will be described. Hereinafter, a game system that includes a terminal apparatus operated by a player and a server apparatus capable of communicating with and connecting to the terminal apparatus and is related to a battle game which progresses by executing a predetermined action on an enemy object will be illustratively described as the fifth embodiment of the present invention.

Figure 16:
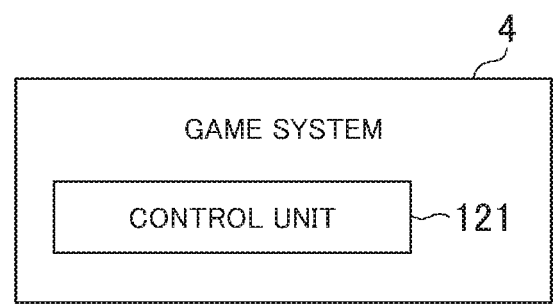
FIG. 16 is a block diagram illustrating a configuration of a game system corresponding to at least one embodiment of the present invention.

FIG. 16 is a block diagram illustrating a configuration of a game system corresponding to at least one embodiment of the present invention. The game system 4 includes at least a control unit 121.

The control unit 121 has a function of controlling the predetermined action to be executable on one enemy object in a case where one or more host objects having a predetermined first relationship with the one enemy object is/are present and any of the host objects is a first object, and a case where the one or more host objects having the predetermined first relationship with the one enemy object is/are present and any of the host objects is a second object having a predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object.

Figure 17:
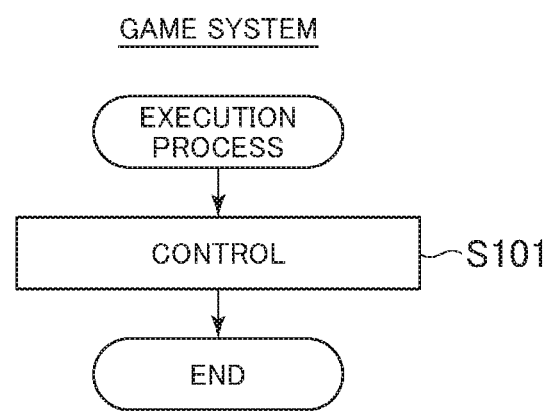
FIG. 17 is a flowchart of an execution process corresponding to at least one embodiment of the present invention.

An execution process in the fifth embodiment of the present invention will be described. FIG. 17 is a flowchart of an execution process corresponding to at least one embodiment of the present invention.

A game system 4 includes the terminal apparatus operated by the player and the server apparatus capable of communicating with and connecting to the terminal apparatus. The game system 4 controls the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controls the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object (step S101), and terminates the process.

As one aspect of the fifth embodiment, by controlling the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object, a game program of sufficient interest having high strategic quality can be provided.

In the fifth embodiment, each of the "terminal apparatus", the "server apparatus", the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

In the fifth embodiment, for example, the "game system" refers to a combination of hardware, software, and a network for the purpose of playing the game.

Sixth Embodiment

Next, a summary of a sixth embodiment of the present invention will be described. Hereinafter, a game program for executing a battle game that progresses by executing a predetermined action on an enemy object in a terminal apparatus that is operated by a player and is capable of communicating with and connecting to a server apparatus will be illustratively described as the sixth embodiment of the present invention.

Figure 18:
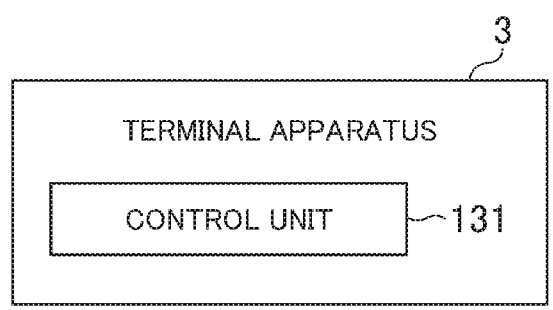
FIG. 18 is a block diagram illustrating a configuration of a terminal apparatus corresponding to at least one embodiment of the present invention.

FIG. 18 is a block diagram illustrating a configuration of a terminal apparatus corresponding to at least one embodiment of the present invention. The terminal apparatus 3 includes at least a control unit 131.

The control unit 131 has a function of controlling the predetermined action to be executable on one enemy object in a case where one or more host objects having a predetermined first relationship with the one enemy object is/are present and any of the host objects is a first object, and a case where the one or more host objects having the predetermined first relationship with the one enemy object is/are present and any of the host objects is a second object having a predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object.

Figure 19:
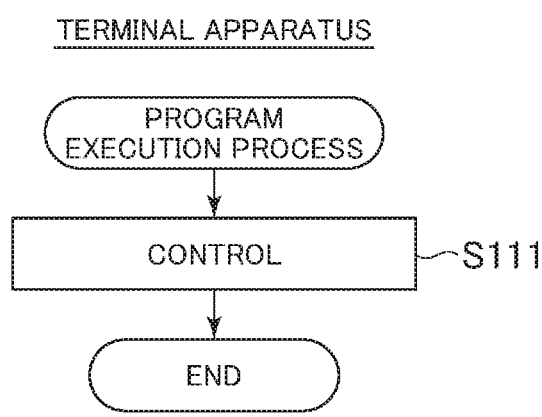
FIG. 19 is a flowchart of a program execution process corresponding to at least one embodiment of the present invention.

A program execution process in the sixth embodiment of the present invention will be described. FIG. 19 is a flowchart of a program execution process corresponding to at least one embodiment of the present invention.

The terminal apparatus 3 controls the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controls the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object (step S111), and terminates the process.

As one aspect of the sixth embodiment, by controlling the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object, a game program of sufficient interest having high strategic quality can be provided.

In the sixth embodiment, each of the "terminal apparatus", the "server apparatus", the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

Seventh Embodiment

A summary of a seventh embodiment of the present invention will be described. Hereinafter, a game program causing a computer apparatus to execute a battle game that progresses by executing a predetermined action on an enemy object will be illustratively described as the seventh embodiment of the present invention.

Figure 20:
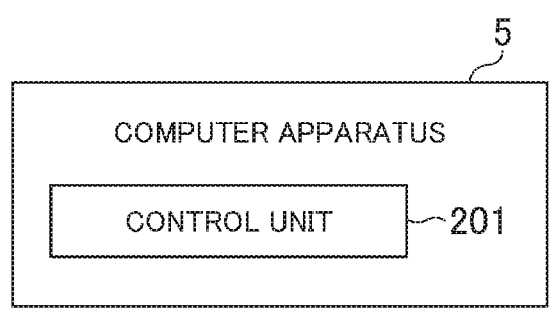
FIG. 20 is a block diagram illustrating a configuration of a computer apparatus corresponding to at least one embodiment of the present invention.

FIG. 20 is a block diagram illustrating a configuration of a computer apparatus corresponding to at least one embodiment of the present invention. A computer apparatus 5 includes at least a control unit 201.

The control unit 201 has a function of controlling the predetermined action to be executable on one enemy object in a case where one or more host objects having a predetermined first relationship with the one enemy object is/are present and any of the host objects is a first object, and a case where the one or more host objects having the predetermined first relationship with the one enemy object is/are present and any of the host objects is a second object having a predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object.

Figure 21:
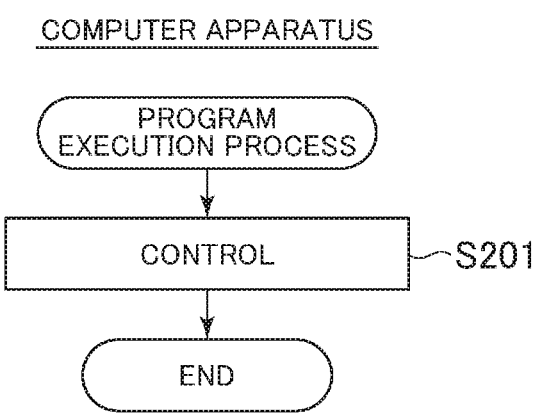
FIG. 21 is a flowchart of a program execution process corresponding to at least one embodiment of the present invention.

A program execution process in the seventh embodiment of the present invention will be described. FIG. 21 is a flowchart of a program execution process corresponding to at least one embodiment of the present invention.

The computer apparatus 5 controls the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controls the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object (step S201), and terminates the process.

As one aspect of the seventh embodiment, by controlling the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object, a game program of sufficient interest having high strategic quality can be provided.

In the seventh embodiment, each of the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

In the seventh embodiment, for example, the "computer apparatus" refers to a desktop or laptop personal computer, a tablet computer, or a PDA and may be a portable terminal of which a display screen includes a touch panel sensor.

Eighth Embodiment

Next, a summary of an eighth embodiment of the present invention will be described. Hereinafter, a game program causing a computer apparatus to execute a battle game that progresses by executing a predetermined action on an enemy object will be illustratively described as the eighth embodiment of the present invention.

A configuration of the computer apparatus of the eighth embodiment can employ the configuration illustrated in the block diagram of FIG. 6 within a necessary range.

Next, a program execution process in the eighth embodiment of the present invention will be described. The program execution process in the eighth embodiment of the present invention can employ the contents disclosed in FIG. 8 within a necessary range.

Summary of Battle Game A summary of the battle game can employ the game of battle in which a plurality of players participate, divide into several groups, and acquire a point by increasing the number of bases of a host group as disclosed in the fourth embodiment.

Preparation Period 1

Contents related to preparation period 1 can employ the contents disclosed in the fourth embodiment within a necessary range.

Battle Period 1

Figure 22:
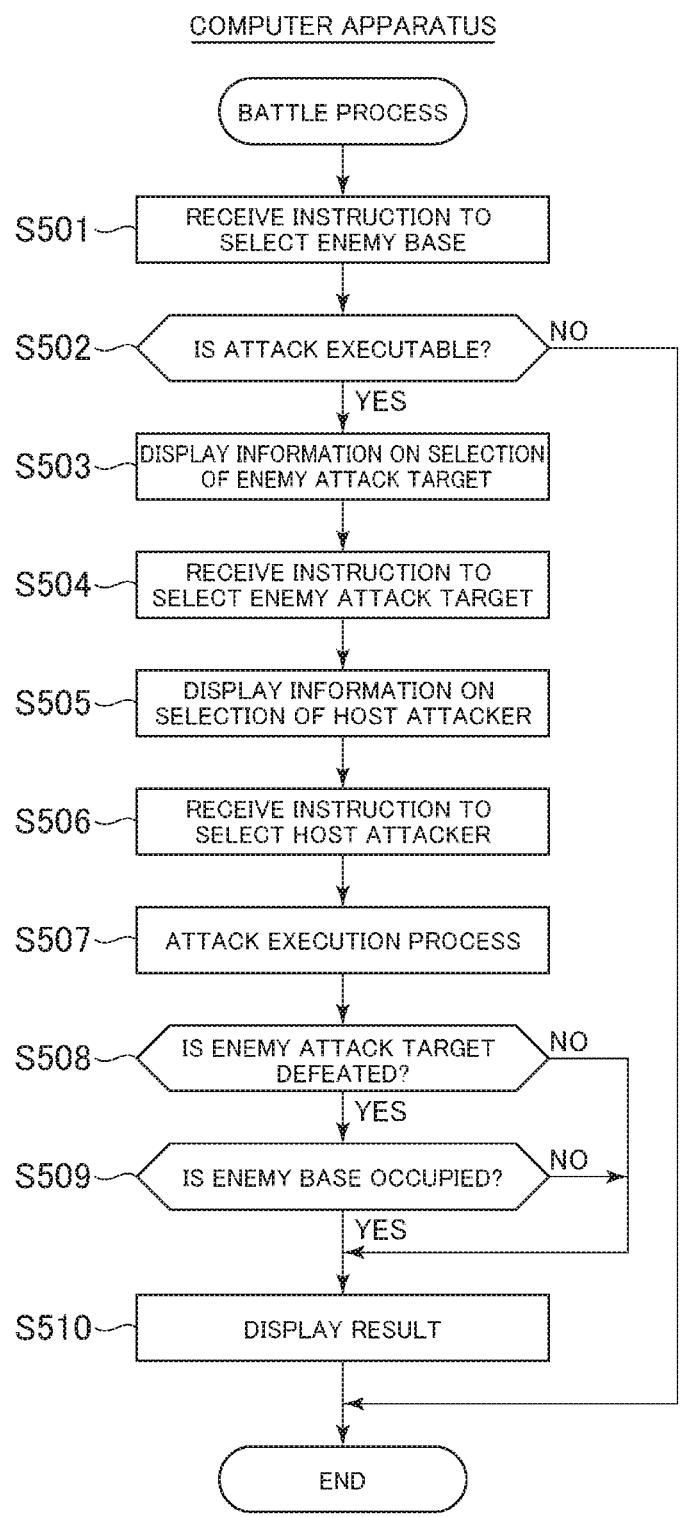
FIG. 22 is a flowchart of a battle process corresponding to at least one embodiment of the present invention.

FIG. 22 is a diagram representing a flowchart of a battle process of step S43 corresponding to at least one embodiment of the present invention.

In a case where the battle is started, the player can select an enemy base of an attack target in the computer apparatus 5 (step S501).

In a case where attack is controlled to be non-executable (No in step S502), the battle process is terminated. In a case where attack is controlled to be executable in step S502 (Yes in step S502), defense decks that can be selected as the attack target and are arranged in the enemy base are displayed on the display unit 41 of the computer apparatus (step S503). The player selects one of the defense decks arranged in the enemy base (step S504). Next, character cards that can be selected for attack by the player are displayed on the display unit 41 of the computer apparatus (step S505). The player creates a host attack deck for the combat with the defense deck (step S506). After the defense deck of the enemy and the host attack deck are determined, the combat in the base is performed (step S507). In a case where the combat is finished, a result is displayed on the display unit 41 of the computer apparatus (step S510), and the process is terminated.

The displayed result is changed depending on whether or not the physical strength or troop strength of the cards included in the defense deck of the enemy becomes zero (step S508). The displayed result is also changed depending on whether or not the physical strength or troop strength of the cards included in all defense decks arranged in the enemy base becomes zero (step S509). In a case where the physical strength or troop strength of the cards included in the defense deck of the enemy becomes zero, the result is winning in the combat. In a case where the physical strength or troop strength of the cards included in all defense decks arranged in the enemy base becomes zero, the result is occupation of the enemy base.

The combat performed in the base may be a turn-based battle that progresses by causing the characters included in the defense deck to alternately attack, may be a battle based on the total evaluation of the strength of the characters included in the deck, or may be a battle based on a puzzle or a quiz. The defense deck performing the combat may be displayed as "in combat" and may not be selected as the attack target.

In a case where the enemy base is occupied, the enemy base turns into the host base and is not set as the attack target from the enemy until an elapse of a predetermined time period. In the meantime, the defense deck can be arranged in the newly possessed host base. Among bases, a base that exerts an additional effect advantageous for the combat in terms of performance and/or characteristics on the character cards possessed by the player for a predetermined time period in a case where the player occupies the base may be present. The defense deck arranged in the occupied base may be automatically returned to the capital and be arranged as the defense deck of the capital.

When the battle period is started, a new base not belonging to any guild may be generated, and an additional effect disadvantageous for the combat in terms of performance and/or characteristics may be exerted on the cards of the defense deck arranged in a base adjacent to the base for a predetermined time period. One base of a target on which the additional effect disadvantageous for the combat is exerted may be randomly selected from bases adjacent to the new base not belonging to any guild. Selection of the base of the target on which the additional effect disadvantageous for the combat is exerted may be performed at predetermined time intervals.

The contents disclosed in the fourth embodiment and FIGS. 11A and 11B, FIG. 12, and FIG. 13 can be employed for controlling the executability of attack in step S502 within a necessary range.

During the battle period, step S43 may be executed a plurality of times. For example, the combat in the enemy base may be executed 10 times per player, may not be executed even once, or may be executed once or a plurality of times.

During the battle period, the defense deck arranged in the base may be set to be not movable.

Preparation Period 2

Contents related to preparation period 2 can employ the contents disclosed in the fourth embodiment within a necessary range.

Battle Period 2

Contents related to battle period 2 can employ the contents disclosed in the fourth embodiment within a necessary range.

Rank Determination Period

Figure 23:
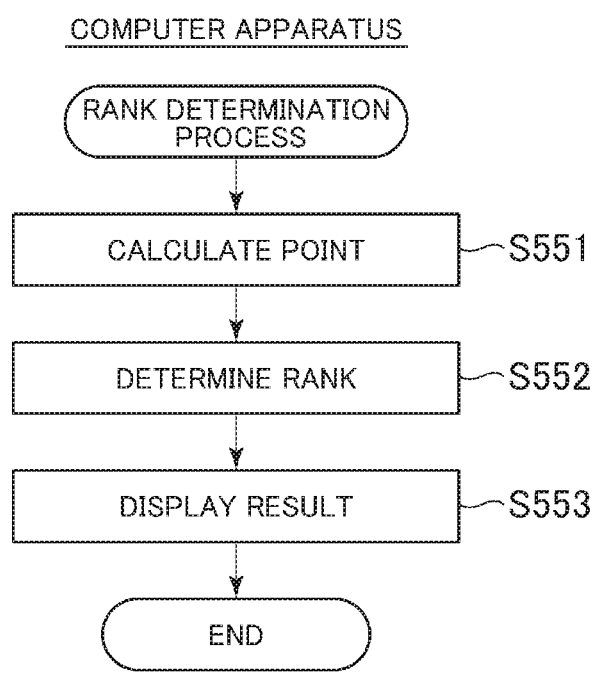
FIG. 23 is a flowchart of a rank determination process corresponding to at least one embodiment of the present invention.

Next, a rank determination process in the eighth embodiment of the present invention will be described. FIG. 23 is a flowchart of the rank determination process corresponding to at least one embodiment of the present invention.

In a case where the battle period is finished, the point is calculated based on the number of possessed bases and/or a possession time period of each guild in the computer apparatus (step S551). The contents disclosed in the fourth embodiment and FIG. 15 can be employed for a point master table within a necessary range. The point 62 corresponding to the number of bases 61 is specified with reference to the point master table 60 in accordance with the number of bases possessed by each guild at the end of the battle. The point may be calculated in proportion to the number of possessed bases, or the point may be inclined in accordance with the importance of the base or may be added in accordance with the possession time period. For example, one point may correspond to a case where the number of possessed bases is 1 to 5, and two points may correspond to a case where the number of possessed bases is 6 to 10. The point may not be calculated for the host base that is possessed but is not connected to the capital by traversing the host bases connected through paths. The point may be calculated for the host base that is attacked from the enemy but is not occupied.

In a case where the point is calculated, a rank is determined in accordance with the acquired point of each guild (step S552). Next, a result is displayed on the display unit 41 of the computer apparatus (step S553), and the process is terminated. For example, the first rank, the second rank, and the third rank are set in order from the guild acquiring the most points. A reward in virtual currency or the like usable in the game may be provided to each guild in accordance with the rank.

In the eighth embodiment, the applicable field of game can employ the contents disclosed in the fourth embodiment.

As one aspect of the eighth embodiment, by controlling the predetermined action to be executable on the one enemy object in a case where the one or more host objects having the predetermined first relationship with the one enemy object is/are present and any of the host objects is the first object, and a case where the one or more host objects having the predetermined first relationship with the one enemy object is/are present and any of the host objects is the second object having the predetermined second relationship with the first object, and controlling the predetermined action to be non-executable on the one enemy object in a case where the one or more host objects having the predetermined first relationship with the one enemy object is/are not present, and a case where none of the host objects having the predetermined first relationship with the one enemy object is the first object or the second object having the predetermined second relationship with the first object, a game program of sufficient interest having high strategic quality can be provided.

As one aspect of the eighth embodiment, by enabling the enemy object to turn into the host object in a case where the predetermined action is executed on the enemy object and the predetermined condition is satisfied, the interest of the game such as increasing the number of possessed host objects can be provided.

As one aspect of the eighth embodiment, by calculating the point involved in winning and losing of the game in accordance with the number of second objects having the predetermined second relationship with the first object and the number of second enemy objects having the predetermined second relationship with the first enemy object, not only the number of possessed objects but also arrangement of host objects and enemy objects is prioritized in terms of strategy, and the interest of the game can be improved.

As one aspect of the eighth embodiment, by not calculating the point for the second object not having the predetermined second relationship with the first object and not calculating the point for the second enemy object not having the predetermined second relationship with the first enemy object, the arrangement of the host objects and the enemy objects is prioritized in terms of strategy, and the interest of the game can be improved.

As one aspect of the eighth embodiment, by determining the rank based on the calculated point, motivation for gradually turning the enemy object into the host object while considering the arrangement of the host objects and the enemy objects is provided, and the interest of the game can be improved.

As one aspect of the eighth embodiment, by controlling the predetermined action to be non-executable on the enemy object until an elapse of the predetermined time period from satisfaction of the predetermined condition in a case where the predetermined action is executed on the enemy object and the predetermined condition is satisfied, preparation can be performed before the predetermined action is executed by the enemy.

As one aspect of the eighth embodiment, by arranging a defender in the host object for defending the object from the predetermined action, the strategic quality and the interest of the game such as reviewing the defender for not allowing the host object to be easily captured can be improved. For example, in a case where there is a difference in importance between the host objects due to the arrangement of the host objects, stronger defender can be arranged in the host object having higher importance.

As one aspect of the eighth embodiment, by setting the battle game as a game in which a plurality of groups battle and configuring each group with a plurality of players, a battle having unexpectedness can be expected unlike a battle controlled by the program.

As one aspect of the eighth embodiment, by controlling the executability of the predetermined action in a case where the player selects the enemy object, the player can easily predict the executability of the predetermined action by recognizing the arrangement of the enemy objects and the host objects in the case of trying to select the enemy object.

As one aspect of the eighth embodiment, by controlling the executability of the predetermined action at the predetermined time intervals, the required strategic quality can be diversified. For example, in the case of control for once in every 0.1 seconds, a time lag between the time of selecting the predetermined action by the player and the time of controlling the executability of the predetermined action by a controller is reduced. Thus, the player is required to instantaneously read a battle situation that changes every moment. In the case of control for once in every 30 minutes, long-term strategic quality such as how to advantageously maneuver the battle situation during 30 minutes is required compared to the former.

As one aspect of the eighth embodiment, by configuring one or more battle periods and controlling the executability of the predetermined action at the start of the battle period, the arrangement of the enemy objects and the host objects at the start of the battle can be prioritized. For example, in a case where two or more battle periods are configured and the arrangement of the enemy objects and the host objects at the end of the immediately previous battle is reflected at the start of the subsequent battle, a game having high strategic quality such as preventing the host object not having the predetermined second relationship at the end of the immediately previous battle can be set.

In the eighth embodiment, each of the "object", the "host object", the "enemy object", the "predetermined action", the "battle game", the "game program", the "predetermined host object", the "predetermined first relationship", and the "predetermined second relationship" can employ the contents disclosed in the first embodiment within a necessary range.

In the eighth embodiment, the "predetermined condition" and a "predetermined enemy object" can employ the contents disclosed in the second embodiment within a necessary range.

In the eighth embodiment, the "point" can employ the contents disclosed in the third embodiment within a necessary range.

In the eighth embodiment, the "predetermined time intervals" can employ the contents disclosed in the fourth embodiment within a necessary range.

In the eighth embodiment, the "computer apparatus" can employ the contents disclosed in the seventh embodiment within a necessary range.

APPENDIX

The description of the embodiments described above has been described so that those having ordinary knowledge in the field to which the invention belongs can carry out the following invention.

[1] A game program causing a server apparatus to execute a battle game that progresses by executing a predetermined action on an enemy object in the server apparatus capable of communicating with and connecting to a terminal apparatus operated by a player, the game program causing the server apparatus to function as a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

[2] The game program according to [1], wherein the enemy object is capable of turning into a host object in a case where the predetermined action is executed on the enemy object and a predetermined condition is satisfied.

[3] The game program according to [1] or [2], further causing the server apparatus to function as, in a case where a predetermined enemy object among enemy objects is defined as a first enemy object and furthermore, an enemy object different from the first enemy object is defined as a second enemy object, a point calculator that calculates a point involved in winning and losing of the game in accordance with the number of second objects having the predetermined second relationship with the first object and the number of second enemy objects having the predetermined second relationship with the first enemy object.

[4] The game program according to [3], wherein the point calculator does not calculate the point for the second object not having the predetermined second relationship with the first object, and does not calculate the point for the second enemy object not having the predetermined second relationship with the first enemy object.

[5] The game program according to [3] or [4], further causing the server apparatus to function as a rank determiner that determines a rank based on the calculated point.

[6] The game program according to any one of [1] to [5], wherein the controller controls the predetermined action to be non-executable on the enemy object until an elapse of a predetermined time period in a case where the predetermined action is executed on the enemy object and a predetermined condition is satisfied.

[7] The game program according to any one of [1] to [6], further causing the server apparatus to function as a defense arranger that arranges defender in a host object for defending the object from the predetermined action.

[8] The game program according to any one of claims [1] to [7], wherein the battle game is a game in which a plurality of groups battle, and each group is configured with a plurality of players.

[9] The game program according to any one of [1] to [8], wherein the controller controls executability of the predetermined action in a case where the player selects the enemy object.

[10] The game program according to any one of [1] to [9], wherein the controller controls executability of the predetermined action at predetermined time intervals.

[11] The game program according to any one of [1] to [10], wherein the battle game is configured with one or more battle periods, and the controller controls executability of the predetermined action at a start of the battle period.

[12] A server apparatus on which the game program according to any one of [1] to [11] is installed.

[13] A game system that includes a terminal apparatus operated by a player and a server apparatus capable of communicating with and connecting to the terminal apparatus and is related to a battle game which progresses by executing a predetermined action on an enemy object, the game system including a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

[14] A game program for executing a battle game that progresses by executing a predetermined action on an enemy object in a terminal apparatus that is operated by a player and is capable of communicating with and connecting to a server apparatus, the game program causing the terminal apparatus to function as a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

[15] A terminal apparatus on which the game program according to [14] is installed.

[16] A method of controlling a battle game that progresses by executing a predetermined action on an enemy object in a server apparatus capable of communicating with and connecting to a terminal apparatus operated by a player, the method including, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controlling the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controlling the predetermined action to be non-executable on the one enemy object.

[17] A method of controlling a battle game that progresses by executing a predetermined action on an enemy object in a game system including a terminal apparatus operated by a player and a server apparatus capable of communicating with and connecting to the terminal apparatus, the method including, by the terminal apparatus or the server apparatus, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controlling the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controlling the predetermined action to be non-executable on the one enemy object.

[18] A game program causing a computer apparatus to execute a battle game that progresses by executing a predetermined action on an enemy object, the game program causing the computer apparatus to function as a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

[19] A game program causing a computer apparatus to execute a battle game that progresses by executing a predetermined action on an enemy region, the game program causing the computer apparatus to function as a controller that, given that a predetermined host region among host regions is defined as a first region and furthermore, a host region different from the first region is defined as a second region, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

[20] A computer apparatus in which a battle game progresses by executing a predetermined action on an enemy object, the computer apparatus including a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object.

[21] A game control method of controlling a battle game by executing a predetermined action on an enemy object, the game control method including, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controlling the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controlling the predetermined action to be non-executable on the one enemy object.

The invention claimed is:

1. A non-transitory computer-readable recording medium including a game program causing a server apparatus to execute a battle game that progresses by executing a predetermined action on an enemy object in the server apparatus capable of communicating with and connecting to a terminal apparatus operated by a player, the game program causing the server apparatus to function as:
   a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object,
   wherein the enemy object turns into a converted host object in a case where the predetermined action is executed on the enemy object and a predetermined condition is satisfied,
   wherein a display of the converted host object being turned from the enemy object into the converted host object is updated to show as a host object,
   wherein the predetermined first relationship is a relationship in which objects have an adjacent positional relationship, and
   wherein the predetermined second relationship is a relationship of connections to the predetermined host object in a case of traversing the second object having the predetermined first relationship.

2. The non-transitory computer-readable recording medium according to claim 1, further causing the server apparatus to function as, in a case where a predetermined enemy object among enemy objects is defined as a first enemy object and furthermore, an enemy object different from the first enemy object is defined as a second enemy object, a point calculator that calculates a point involved in winning and losing of the game in accordance with the number of second objects having the predetermined second relationship with the first object and the number of second enemy objects having the predetermined second relationship with the first enemy object.

3. The non-transitory computer-readable recording medium according to claim 2, wherein the point calculator does not calculate the point for the second object not having the predetermined second relationship with the first object, and does not calculate the point for the second enemy object not having the predetermined second relationship with the first enemy object.

4. The non-transitory computer-readable recording medium according to claim 2, further causing the server apparatus to function as a rank determiner that determines a rank based on the calculated point.

5. The non-transitory computer-readable recording medium according to claim 1, wherein the controller controls the predetermined action to be non-executable on the enemy object until an elapse of a predetermined time period in a case where the predetermined action is executed on the enemy object and the predetermined condition is satisfied.

6. The non-transitory computer-readable recording medium according to claim 1, further causing the server apparatus to function as a defense arranger that arranges defender in a host object for defending the host object from the predetermined action.

7. The non-transitory computer-readable recording medium according to claim 1, wherein the battle game is a game in which a plurality of groups battle, and each group is configured with a plurality of players.

8. The non-transitory computer-readable recording medium according to claim 1, wherein the controller controls executability of the predetermined action in a case where the player selects the enemy object.

9. The non-transitory computer-readable recording medium according to claim 1, wherein the controller controls executability of the predetermined action at predetermined time intervals.

10. The non-transitory computer-readable recording medium according to claim 1, wherein the battle game is configured with one or more battle periods, and the controller controls executability of the predetermined action at a start of the battle period.

11. A game system that includes a terminal apparatus operated by a player and a server apparatus capable of communicating with and connecting to the terminal apparatus and is related to a battle game which progresses by executing a predetermined action on an enemy object, the game system including:
a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object,
wherein the enemy object turns into a converted host object in a case where the predetermined action is executed on the enemy object and a predetermined condition is satisfied,
wherein a display of the converted host object being turned from the enemy object into the converted host object is updated to show as a host object,
wherein the predetermined first relationship is a relationship in which objects have an adjacent positional relationship, and
wherein the predetermined second relationship is a relationship of connections to the predetermined host object in a case of traversing the second object having the predetermined first relationship.

12. A non-transitory computer-readable recording medium including a game program for executing a battle game that progresses by executing a predetermined action on an enemy object in a terminal apparatus that is operated by a player and is capable of communicating with and connecting to a server apparatus, the game program causing the terminal apparatus to function as:
a controller that, given that a predetermined host object among host objects is defined as a first object and furthermore, a host object different from the first object is defined as a second object, in a case where one or more host objects having a predetermined first relationship with one enemy object is/are present and any of the host objects is the first object, and a case where the one or more host objects having the predetermined first relationship with the one enemy object is/are present and any of the host objects is the second object having a predetermined second relationship with the first object, controls the predetermined action to be executable on the one enemy object, and in a case where the one or more host objects having the predetermined first relationship with the one enemy object is/are not present, and a case where none of the host objects having the predetermined first relationship with the one enemy object is the first object or the second object having the predetermined second relationship with the first object, controls the predetermined action to be non-executable on the one enemy object,
wherein the enemy object turns into a converted host object in a case where the predetermined action is executed on the enemy object and a predetermined condition is satisfied,
wherein a display of the converted host object being turned from the enemy object into the converted host object is updated to show as a host object,
wherein the predetermined first relationship is a relationship in which objects have an adjacent positional relationship, and
wherein the predetermined second relationship is a relationship of connections to the predetermined host object in a case of traversing the second object having the predetermined first relationship.

* * * * *